J. D. MAXFIELD.
AUXILIARY STEERING GEAR FOR VEHICLES.
APPLICATION FILED MAR. 15, 1911.
1,054,975.
Patented Mar. 4, 1913.
2 SHEETS—SHEET 1.
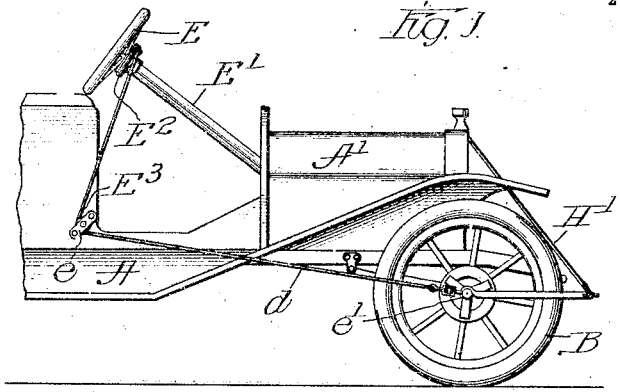
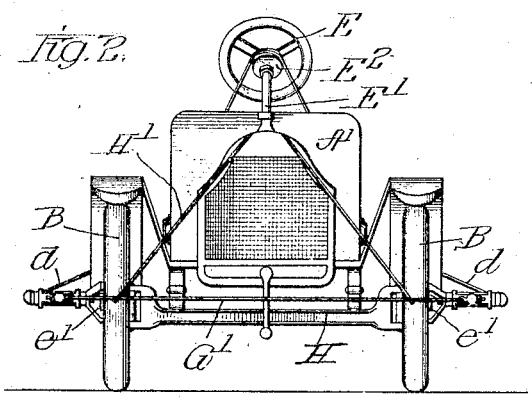
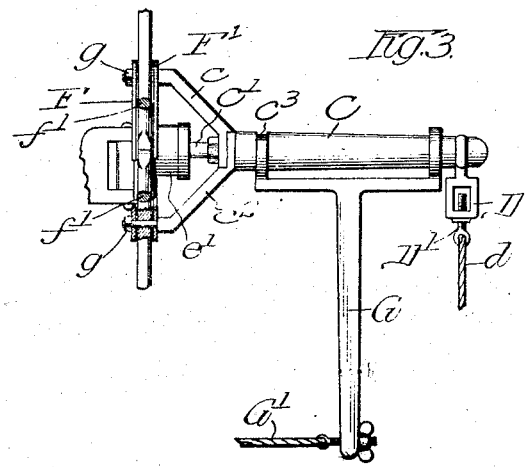
Witnesses:
Robert N. Weir
Leo J. DuMais
Inventor
John D. Maxfield
By Thurun King Atty.

J. D. MAXFIELD.
AUXILIARY STEERING GEAR FOR VEHICLES.
APPLICATION FILED MAR. 15, 1911.
1,054,975.
Patented Mar. 4, 1913.
2 SHEETS—SHEET 2.
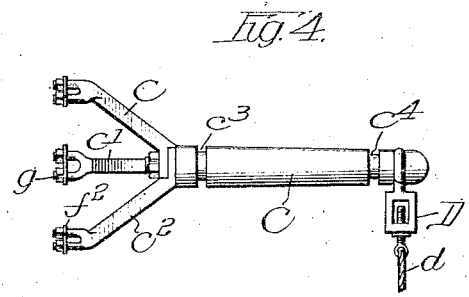
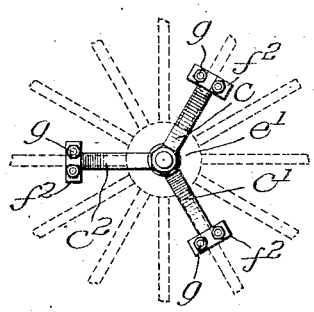
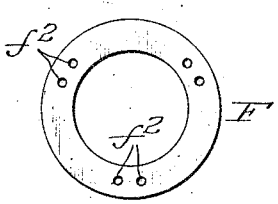
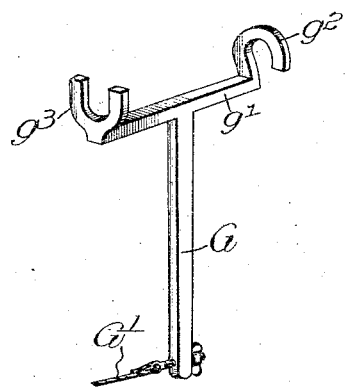
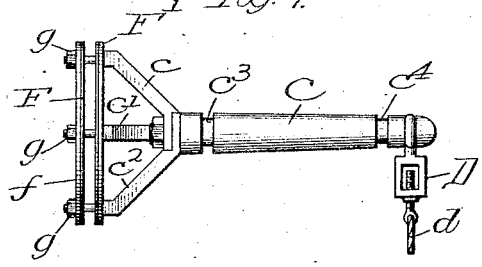

UNITED STATES PATENT OFFICE.

JOHN D. MAXFIELD, OF HEMET, CALIFORNIA.

AUXILIARY STEERING-GEAR FOR VEHICLES.

1,054,975.  Specification of Letters Patent.  Patented Mar. 4, 1913.

Application filed March 15, 1911. Serial No. 614,558.

*To all whom it may concern:*

Be it known that I, JOHN D. MAXFIELD, a citizen of the United States, residing at Hemet, in the county of Riverside and State of California, have invented certain new and useful Improvements in Auxiliary Steering-Gears for Vehicles, of which the following, taken in connection with the drawings, is a description.

My invention has for its object the production of an auxiliary steering gear for automobiles or like vehicles, and is designed more particularly to be used in case the steering mechanism of the machine is accidentally broken or for any other reason cannot be operated.

My invention is so constructed that it is portable, occupies small space, is easily made and applied and very effectual in service when needed.

Another object of my invention is to produce an apparatus of this kind which is so constructed that it may be applied to any make of vehicle without any specially arranged parts or mechanism.

In the accompanying drawings I have illustrated what I now consider the preferred form of my apparatus, showing two simple methods of applying it to the vehicle when needed, although I contemplate other changes in the details of my construction which may come within the scope of my claims without departing from the spirit of my invention, and in these drawings—

Figure 1 is a side elevation of the forward part of a motor vehicle with my apparatus attached thereto; Fig. 2 is a front elevation of the same: Fig. 3 is a side elevation of one half of my apparatus applied to the wheel of a vehicle; Fig. 4 is a side view of the tripod detached from the machine; Fig. 5 is an end elevation of the hub of the wheel illustrating the manner of securing the attachment to the spokes of the wheel; Fig. 6 is a perspective detail of one of the hanger bars; Fig. 7 is a view of the tripod similar to Fig. 4 illustrating the manner of securing the tripod to the spokes of the wheel with rings. Fig. 8 is a plan view of one of the securing rings.

Referring to the drawings A represents the body, A' the hood, B, B, the front wheels of an automobile of any well known construction.

My auxiliary mechanism comprises an attaching member having a rod or shaft C, upon one end of which is a tripod of three arms $c$, $c'$, $c^2$, each of which may be bifurcated at the end thereof, for a purpose to be hereinafter explained.

A swivel or turn-buckle D having a take up screw D' is secured to the ends of the rods C as shown in Figs. 3, 4, 7, and secured thereto is a rope or cable $d$.

E is a steering wheel and E' the steering rod as used on any motor car. A small drum $E^2$ is mounted upon the rod E' near the wheel E. A pulley block $e$ is stationarily secured upon either side of the car body as nearly as may be in line with the attaching member C projecting from the wheels B, B.

A ring F having a facing $f$ of leather, or other material, to protect the spokes, is placed upon one side of the spokes of the wheel and a similar ring F' is placed upon the opposite side thereof. The forks of the bifurcated ends of the arms $c'$, $c^2$, of the tripod extend through coincident apertures $f^2$ in these rings and are secured by nuts $g$ or otherwise, so that the tripod is held rigidly in position, the rod C extending outwardly from the hub of each front wheel.

If desired to secure directly to the spokes of the wheel, the rings F, F', may be dispensed with by placing the forks of each bifurcation over a spoke in the wheel and extending the same through a metal plate $f$, tightening the same against the spokes with the nuts $g$.

Extending circumferentially around the rod C near each end thereof is a groove $c^4$.

G is a hanger-bar which has a cross arm $g'$ at one end thereof. One end of this arm is formed into an upwardly extending hook $g^2$ and the opposite end into an upwardly extending U-shaped member $g^3$. The hook member $g^2$ is adapted to fit over the end of the shaft in the groove $c^4$, with the U-shaped member $g^3$ bearing against the front side of the shaft in the groove $c^3$. In the event of the connecting rod H being broken, one of these hangers is secured to each rod C extending from the front wheels of the machine and a cable G' extends from the outwardly extending end of one hanger to the outwardly extending end of the other across the front of the machine as shown in Fig. 2. A cable H' is secured near each end of the hanger-bar G and to the hood A' to support the cable G' if it becomes necessary to use this construction.

When the tripod is secured in position upon each of the front wheels of the machine, to the spokes thereof as heretofore explained, the cable or rope $d$ which is secured to the turn-buckle D extends over the pulley $E^3$ and around the drum $E^2$ on the steering rod $E'$, and from thence to the turn buckle D connected with the rod C upon the opposite side of the machine. Should the steering rod be broken or become otherwise incapable of use, the drum may be dispensed with and the machine guided by a direct pull upon the rope or cable $d$.

It will thus be seen that in the event of the steering gear being broken, it would be possible, by attaching the mechanism herein described, to supplement the broken mechanism with my auxiliary gear, and to control and operate the machine. This device is so constructed that should it become necessary to remove entirely the rod connecting the steering knuckles, which would leave no connection between the two front wheels, the hanger bars being attached as described and connected by the front and rear cables will prevent the wheels from spreading, and allow the machine to be operated. Any slack in the cables may be taken up by the take-up screws, and the wheels will be maintained in proper position.

I claim:

1. In an auxiliary steering gear, the combination of the forward wheels and steering rod of a vehicle, with tripod rods having means for temporarily securing them to the outside of said wheels, and a cable secured at the center thereof to the steering rod and at each end to one of the outwardly extending tripod rods whereby an emergency mechanism is provided, substantially as described.

2. In an auxiliary steering gear, the combination of the wheels, body and steering rod of a motor vehicle, with tripod rods having means for detachably connecting them to the spokes of the front wheels of the vehicle, a cable one end of which is connected with each tripod, said cable also being connected with the steering rod whereby a pull may be exerted through either tripod to the wheels connected therewith to temporarily control the direction of movement of the forward wheels of the vehicle and form an emergency steering mechanism.

3. In an auxiliary steering gear, the combination of the wheels, body and steering rod of a vehicle, with rods having means for detachably connecting them to the forward wheels of the vehicle, a cable uniting the outer ends of said rods, a drum mounted upon the steering rod to which said cable is attached near the center thereof, guides secured to the body of the vehicle over which said cable extends, and means for revolving said drum whereby said cable is actuated to turn the forward wheels of the vehicle, and provide an auxiliary steering mechanism.

4. In a steering gear, the combination of the wheels, body and steering rod of a vehicle, with auxiliary steering members detachably connected to the forward wheels of the vehicle and projecting in opposite directions therefrom, a hanger-bar secured to each of said auxiliary steering members, and a cable extending from one of said hanger-bars to the other across the front of the vehicle a second cable having one end thereof connected with each of the aforesaid steering members, a drum mounted upon the steering rod around which said last mentioned cable is wound, means for actuating said cable to turn the forward wheels of the vehicle and temporarily guide the same, substantially as described.

In testimony whereof I have signed this specification in the presence of two subscribing witnesses.

JOHN D. MAXFIELD.

Witnesses:
J. ALFRED JACQUES,
J. C. TIPTON.